US008311394B2

(12) United States Patent
Xu et al.

(10) Patent No.: US 8,311,394 B2
(45) Date of Patent: Nov. 13, 2012

(54) VIDEO ABSTRACTION (75) Inventors: Li-Qun Xu, Ipswich (GB); Bin Luo, Anhui (CN)

(73) Assignee: British Telecommunications plc, London (GB)

( * ) Notice: Subject to any disclaimer, the term of this patent is extended or adjusted under 35 U.S.C. 154(b) by 960 days.

(21) Appl. No.: 12/295,033

(22) PCT Filed: Feb. 21, 2007

(86) PCT No.: PCT/GB2007/000594
§ 371 (c)(1),
(2), (4) Date: Sep. 29, 2008

(87) PCT Pub. No.: WO2007/113458
PCT Pub. Date: Oct. 11, 2007

(65) Prior Publication Data
US 2009/0087122 A1    Apr. 2, 2009

(30) Foreign Application Priority Data

Mar. 30, 2006   (EP) .................................... 06251783

(51) Int. Cl.
*G11B 27/10*    (2006.01)
(52) U.S. Cl. ........................................ 386/290; 348/720
(58) Field of Classification Search ............. 375/E7.227, 375/E7.226, 240.18, E7.241; 348/580, 720; 382/277, 276, 302, 295; 386/290
See application file for complete search history.

(56) References Cited

U.S. PATENT DOCUMENTS

2004/0170321 A1   9/2004 Gong et al.
2009/0087122 A1   4/2009 Xu et al.

FOREIGN PATENT DOCUMENTS
WO    2007/113458    10/2007

OTHER PUBLICATIONS

International Search Report for PCT/GB2007/000594, mailed Mar. 30, 2007.
Xin, Z. et al., "Locality preserving clustering for image database" Proceedings of the 12th ACM International Conference on Multimedia, pp. 885-891, (Oct. 10-16, 2004).
Alan, H. et al., "An Integrated Scheme for Automated Video Abstraction Based on Unsupervised Cluster-Validity Analysis", IEEE Transactions on Circuits and Systems for Video Technology, vol. 9, No. 8, pp. 1280-1289, (Dec. 1999).
Xiaofei, H. et al., "Locality Preserving Projections", Computer Science, pp. 1-8, (2002).
Kokiopoulou, E. et al., "Orthogonal Neighborhood Preserving Projections", 5th IEEE International Conference on Data Mining, pp. 234-241, (Nov. 27, 2005).

(Continued)

*Primary Examiner* — Gilberto Barron, Jr.
*Assistant Examiner* — Izunna Okeke
(74) *Attorney, Agent, or Firm* — Nixon & Vanderhye PC (57) ABSTRACT Video data defining a series of images is processed to define a first series of nodes in a first multidimensional space, each of the first series of nodes corresponding to an image of the series of images and its location in the first space defined in dependence on features of the respective image. A transformation function maps each of the nodes in the first multidimensional space onto a respective node in a second lower dimensionality multidimensional space while maintaining neighborhood relationships between nodes. A second series of nodes in the second multidimensional space is defined in accordance with the transformation function and a clustering analysis is performed in dependence on the nodes of the second multidimensional space.

22 Claims, 9 Drawing Sheets

OTHER PUBLICATIONS

Sun, X. et al., "Video Summarization Using R-Sequences", Real-Time Imaging, vol. 6, No. 6, pp. 449-459, (Dec. 2000).

P. N. Belhumeur et al., "Eigenfaces vs. Fisherfaces: Recognition using class specific liner projection," IEEE Trans. on Pattern Analysis and Machine Intelligence (PAMI), 19(7):711-720, 1997.

C. J. C. Burges, "Geometric methods for feature extraction and dimensional reduction—a guided tour," In the Data Mining and Knowledge Discovery Handbook, 59-92, 2005.

D. Gatica-Perez et al., "Assessing scene structuring in consumer videos," Proc. of CIVR'04, Dublin, 2004.

A. Hanjalic and HongJiang Zhang, "An integrated scheme for automated video abstraction based on unsupervised cluster-validity analysis," IEEE Trans. on CSVT, 9(8):1280-1289, Dec. 1999.

X. He and P. Niyogi, "Locality preserving projections," In Advances in Neural Information Processing Systems 16, MIT Press, Cambridge, MA 2004.

X. He et al., "Face recognition using laplacianfaces," IEEE Trans. on PAMI, 27(3):328-340, 2005.

P. Indyk, "On approximate nearest neighbors in non-euclidean spaces," Proc. of $39^{th}$ Annual Symposium on Foundations of Computer Science (FOCS '98), Nov. 1998, Palo Also, CA, 148-155.

A. K. Jain et al., "Data clustering: a review," ACM Computing Survey, 31(3), 264-323, 1999.

A. Joshi et al., "On fuzzy clustering and content-based access to networked video databases," Proc. of the Workshop on Research Issues in Database Engineering (RIDE '98), p. 42, Washington, DC, USA, 1998. IEEE Computer Society.

Y. Li et al., "An overview of video abstraction techniques," Tech. Report HPL-2001-191, Jul. 2001, Imaging Systems Laboratory, HP Laboratories Palo Alto.

J. M. Odobez et al., "On spectral methods and the structuring of home videos," IDIAP-RR 02-55, Nov. 2002. (ftp://ftp.idiap.ch/pub/reprots/2002/rr02-55.pdf).

L. K. Saul and S. T. Roweis, "Think globally, fit locally: Unsupervised learning of low dimensional manifold," Journal of Machine Learning Research, 4:119-155, 2003.

J. Vendrig and M. Worring, "Systematic evaluation of logical story unit segmentation," IEEE Trans. on Multimedia, 4(4), Dec. 2002.

J. Yang et al., "Two-dimensional pca: A new approach to appearance-based face representation and recognition," IEEE Trans. on PAMI, 26(1):131-137, 2004.

D. Zhang et al., "Semantic video clustering across sources using bipartite spectral clustering," Proc. of ICME '2004, 117-120, 2004, Taiwan.

X. Zheng et al., "Locality preserving clustering for image database," Proc. of the $12^{th}$ annual ACM international conference on Multimedia, 2004.

Graves et al., "Surveillance video indexing with iconic patterns of activity," The IEEE International Conference on Visual Information Engineering, Apr. 6, 2005, pp. 409-416.

Li-Qun Xu and Arasanathan Anjulan, "Relating 'Pace' to Activity Changes in Mono- and Multi-Camera Surveillance Videos," paper given at the $6^{th}$ IEEE International Conference on Advanced Video and Signal Based Surveillance, Genoa, Italy, Sep. 2-4, 2009, pp. 104-109.

A. K. Jain et al., "Data Clustering: A Review," pp. 264 to 323 of ACM Computing Surveys, vol. 31, No. 3, Sep. 1999.

A. Hanjalic and Li-Qun Xu, "Affective Video Content Representation and Modeling," pp. 143-154 of IEEE Transactions on Multimedia, vol. 7, No. 1, Feb. 2005.

Li-Qun Xu and Bin Luo, "Appearance-based Video Clustering in 2D Locality Preserving Projection Subspace," pp. 356-363 of CIVR '07, Jul. 9-11, 2007.

Jeroen Vendrig and Marcel Worring, "Systematic Evaluation of Logical Story Unit Segmentation," pp. 492-499 of IEEE Transactions on Multimedia, vol. 4, No. 4, Dec. 2002.

Tao Xiang and Shaogang Gong, "Activity Based Surveillance Video Segmentation," Department of Computer Science, Queen Mary, University of London, UK, 2 pgs. (date unknown).

International Search Report for PCT/GB2010/000353, mailed Jun. 7, 2010.

Ming Li and Baozong Yuan, "2D-LDA: A statistical linear discriminant analysis for image matrix," Institute of Information Science, Beijing Jiaotong Uuniversity, Beijing, China, Aug. 2004, pp. 527-532.

Chi-Chun Lo and Shuenn-Jyi Wang, "A histogram-based moment-preserving clustering algorithm for video segmentation," Institute of Information Management, National Chiao-Tung University, 1001 Ta Hsueh Road, Hsinchu, Taiwan, Jul. 2001, pp. 2209-2218.

SiBao Chen et al., "Two-Dimensional LPP for Image Recogniation," Key Lab of Intelligent Computing & Signal processing of Ministry of Education, Anhui University, Hefei, China, International Conference on Intelligent Computing, Aug. 23-26, 2005, pp. 1159-1168.

Andrew Y. Ng, CS Division, U.C. Berkeley, Michael I. Jordan, CS Div. & Dept. of Stat., U.C. Berkeley, and Yair Weiss, School of CS & Engr., The Hebrew University, "On Spectral Clustering: Analysis and an algorithm," (2002), 8 pp.

VIDEO ABSTRACTION

This application is the U.S. national phase of International Application No. PCT/GB2007/000594, filed 21 Feb. 2007, which designated the U.S. and claims priority to filed Europe Application No. 06251783.4, filed 30 Mar. 2006, the entire contents of each of which are hereby incorporated by reference.

BACKGROUND

1. Technical Field

This invention relates to methods for video abstraction and segmentation, and most particularly to selecting parts from a video stream that represent significant portions of the overall stream.

2. Related Art

The general objective of video abstraction is to extract compact and meaningful aspects of content from a longer video program (e.g. a news broadcast, a feature movie, or a home video). The extracted content could be static: for instance a series of still images that could be combined into a storyboard, or dynamic: for instance a series of shorter video segments that could be combined into an abridged video clip. The aim is to preserve in the extracted content the inherent flavours and main messages of the original program. Video segmentation involves splitting a longer video program into a series of sub-programs which together include all the content of the longer program. The aim is for each sub-program (segment) to consist of a thematic unit of the longer program: for example each segment could consist of a single scene, shot or semantic event of the longer program.

Abstraction and segmentation involve similar technical problems. Once a video has been segmented into its constituent units, it is often then readily possible to decide how to extract representative frames for each constituent unit.

Automatic video abstraction is one of the most significant current topics in multimedia information management. As the volume of stored video data increases, and improvements in internet technology make increasing amounts of video more readily available, it is becoming increasingly important to be able to browse video data and quickly access specific content within a long video stream. An effective method of video abstraction would enable easy and fast content access and browsing of a large video database as well as facilitating content-based video indexing and retrieval. It would allow end users to interact remotely with selected video elements (e.g., to select and view a particular shot, event, or scene) as depicted in the structured storyboard and view the whole video stream in a non-linear fashion. This would be useful for accessing on-line video data and, for managing home videos and for sharing video data effectively among friends. It would be particularly appealing to users of devices such as mobile phones and PDAs (personal digital assistants) which, due to their limited communication bandwidth and small display size, make it difficult for a user to download and view a long video program.

There has been great interest in video abstraction over the last decade. Reference [12] is a review of general issues in the field. Most recently, efforts have been directed to improving automatic abstraction by designing algorithms that take account of generalized characteristics of specific types of video media. (See, for example, reference [17]). One example of such a type of video is the unstructured home video, which has been studied in references [4] and [15]. Another approach has been to study video summarization together with video segmentation, which can be cast as a data analysis problem to be solved within a data clustering framework. (See, for example reference [9]). Lo and Wang (reference [13]) used histogram-based method to clustering video sequences. A fuzzy clustering method has been used for video segmentation by Joshi et al.; see reference [10]. Recently-developed spectral clustering techniques have also been used for video segmentation; see reference [19].

Data clustering in a very high dimensional space encounters the problem known as the 'curse of dimensionality'. Most video analysis occupies a high dimensional space because of the sheer number of pixels involved in a typical image. This is so even after some conventional feature extraction process. For example, when an 8×8×8 HSV color histogram (which is nowadays considered to be very coarse) is used to represent an image, the feature space will still have 512 dimensions. Currently there are two types of solution to the dimensionality problem. One is the use of approximate nearest neighbor search methods; see reference [8].

The other is the use of dimensionality reduction techniques; see references [2] and [16]. Among the latter, the traditional principal component analysis (PCA), linear discriminant analysis (LDA) and multidimensional scaling (MDS) methods have been well studied. Recently, the method known as locality preserving projection (LPP) has been proposed (see references [6] and [7]). This is a linear projection method. Research has also focused on the so-called spectral clustering method (see reference [14]), which falls into the class of graph-based methods. This class also includes the ISOMAP technique, locally linear embedding (LLE), Laplacian eigenmaps and so on, though these methods yield maps that are defined only on the training data points and it is unclear how to evaluate the maps on novel test data points.

In the field of image and video analysis, the one-dimensional projection methods mentioned above may be expected not work efficiently, because in image and video analysis' there is usually the need to compute a very high dimensional covariance matrix and related eigen-decomposition. Recently, Yang and Zhang (see reference [18]) proposed a method known as two-dimensional principal component analysis (2D-PCA).

The algorithms used for two-dimensional principal component analysis (2D-PCA) will now be discussed.

Let w be an n-dimensional unitary column vector, and $A_i$ be an (m×n)-dimensional random image matrix. Now, projecting $A_i$ onto w by the following linear projection, we obtain an m-dimensional unitary feature vector:

$$x_i = A_i w, \; i=1,2,\ldots,N \qquad (1)$$

The 2D-PCA process seeks a projection direction w which maximizes the total scatter of the resulting projected feature vectors $\{x_i\}$. To measure this, Yang et al. (reference [18]) chose to use the following criterion, called the generalized total scatter criterion:

$$J(w) = tr(S_w) = w^T G_i w, \qquad (2)$$

where $S_w$ is the covariance matrix of the projected feature vectors $\{x_i\}$ from training samples, and $tr(S_w)$ is the trace of $S_w$. $G_i$ is the image covariance (scatter) matrix:

$$G_i = \frac{1}{N} \sum_{j=1}^{N} (A_j - \overline{A})^T (A_j - \overline{A}). \qquad (3)$$

Then the set of optimal projection vectors, $w_1, w_2, \ldots, w_d$, of 2D-PCA are the orthonormlal eigenvectors of $G_1$, which correspond to the first d largest eigenvalues. Note that each principal component of 2D-PCA is a vector, whereas the principal component of PCA is a scalar.

The principal component vectors obtained are used to form an m×d matrix $X_i=[x_i^{(1)}, x_i^{(2)}, \ldots, x_i^{(d)}]$, which is called the feature matrix or feature image of the image sample $A_i$.

This 2D-PCA method reduces computational complexity greatly compared with that of traditional PCA and also improves image/face recognition rates in the comparative studies carried out.

2D-PCA is relatively efficient for projecting images since the size of the covariance matrix is reduced to the square of the number of image columns. Yang and Zhang demonstrated that the 2D-PCA method is computationally more efficient than that of conventional PCA and achieves better performance for face recognition. Following the same thread, Li and Yuan (see reference [11]) proposed a method known as two-dimensional linear discriminant analysis (2D-LDA). Li and Yuan compared 2D-LDA with 2D-PCA and other one-dimensional projection methods and found that 2D-LDA gives better pattern discriminant performance.

Furthermore, a single-dimensional LPP (locality preserving projection) has been proposed. He et al. have proposed in reference [7] the following objective function, seeking to preserve the intrinsic geometry of the data and local structure:

$$\min \sum_{ij} (y_i - y_j)^2 S_{ij}, \quad (4)$$

where $y_i = w^T x_i$ is the one-dimensional representation of original data vector $x_i$ (which can be an mn-dimensional vector representation of an m×n image) and the matrix S is a similarity matrix, which can be a Gaussian weighted or uniformly weighted Euclidean distance using a k-nearest neighbors or ε-neighborhood, i.e., $$S_{ij} = \begin{cases} \exp(\|x_i - x_j\|^2 / t), & \|x_i - x_j\|^2 < \varepsilon \\ 0, & \text{otherwise} \end{cases}, \text{ or} \quad (5)$$

$$S_{ij} = \begin{cases} \exp(\|x_i - x_j\|^2 / t), & \text{if } x_i \text{ is among } k - NN \text{ of } x_j, \text{ or} \\ & x_j \text{ is among } k - NN \text{ of } x_i \\ 0, & \text{otherwise.} \end{cases} \quad (6)$$

By imposing a constraint:

$$y^T D y = 1 \Rightarrow w^T X D X^T w = 1,$$

where $X = [x_1, x_2, \ldots, x_N]$, or an mn×N matrix, and D is a diagonal matrix whose entries are the column sums of S, $D_{ii} = \Sigma_j S_{ji}$. Let L=D-S, then the minimisation problem becomes:

$$\operatorname*{argmin}_{\substack{w \\ w^T X D X^T w = 1}} w^T X L X^T w, \quad (7)$$

such that the optimal projection axis w is given by the minimum eigenvalue solution to the generalised eigenvalue problem:

$$X L X^T w = \lambda X D X^T w \quad (8)$$

He et al. pointed out the relationship between LPP and PCA, LDA: if the similarity matrix S is uniform weight $S_{ij}=1/N^2$, $\forall i,j$ and take ε/k to be infinity, then choose the eigenvectors of $XLX^T$ associated with the largest eigenvalues, the data will be projected along the directions of maximal variance like PCA. If similarity matrix S is within class uniform weight, $S_{ij}=1/N_k$ if $x_i$ and $x_j$ both belong to the kth class otherwise 0, and if data are centralised, then LPP reduces to an LDA algorithm. In implementations of the present invention those conditions are preferably not satisfied.

As for LDA, the application of the LPP algorithm to face recognition is also confronted with the problem of singularity of $XDX^T$. He et al. (reference [7]) chose to perform PCA prior to LPP, calling this method Laplacianfaces in reference to Fisherfaces (see reference [1]). However, this suffers from the problem that after performing the step of PCA it is unknown whether LPP will preserve local information of the original data. The inventors of the present invention have found the first several eigenvectors associated with the first several largest eigenvalues contain mainly lighting variation and face expression information. Experiments have shown that discarding the first three eigenvectors associated with the three largest eigenvalues actually tends to improve the recognition rate. Like LDA, LPP faces a problem of high computational complexity.

More recently Chen et al. derived the two-dimensional locality preserving projection (2D-LPP) method (see reference [3]) and applied it to face recognition tasks with notably favourable results.

There is a need for a method of abstracting video data that is more computationally efficient and/or more representative of the perceptive qualities of the underlying data than prior methods.

BRIEF SUMMARY

According to one aspect of the present invention there is provided a method for processing video data defining a series of images, comprising the steps of: defining a first series of nodes in a first multidimensional space, each of the first series of nodes corresponding to an image of the series of images and its location in the first space being defined in dependence on appearance components of the respective image; defining a transformation function that maps each of the nodes in the first multidimensional space on to a respective node in a second multidimensional space having a lower dimensionality than the first multidimensional space, in such a way that neighborhood relationships between nodes in the first multidimensional space are preserved between the respective nodes in the second multidimensional space; defining a second series of nodes in the second multidimensional space, each of the second series of nodes corresponding to one of the first set of nodes and its location in the second multidimensional space being defined in accordance with the transformation function; and performing a clustering analysis in dependence on the nodes of the second multidimensional space to identify clusters of nodes therein.

According to a second aspect of the present invention there is provided a video processing system for processing video data defining a series of images, the system comprising processing means configured for performing the said method. The processing means may comprise means for performing each step of the method.

The location of each point in the first space is preferably defined by means of a pixel and/or feature mapping algorithm. That algorithm may conveniently involve the identification of one or more aspects of the appearance of one or more pixels or features in the image and in dependence thereon determining the location of the node corresponding to that image in the multidimensional space. The location of the node is preferably also dependent on the time and/or sequence of the image in the original video, such that images that are nearby in such time and/or sequence are nearby in the multidimensional space, and vice versa.

Suitably one of the dimensions in the first multidimensional space represents the time or sequence in the original video of the image corresponding to each of the first series of points. Thus, temporal relationships are preferably preserved in the mapping of images on to the multidimensional space.

Preferably the step of defining the transformation function comprises: defining a graph representing the relationships between neighboring nodes of the first space; assigning a weight to each such relationship; and calculating the transformation function in dependence on the determined mapping. The transformation function may be a two-dimensional linear projection function.

The step of defining a graph preferably comprises: identifying pairs of the first series of nodes that collectively satisfy a pre-defined neighborhood condition as being neighboring nodes; and defining edges in the first space that connect the neighboring nodes. The neighborhood condition may be determined by pre-processing of training data. Such pre-processing is preferably performed in dependence on the said video data. This may conveniently train the system to respond to characteristics of that data.

Conveniently the step of assigning a weight to each relationship comprises assigning a weight to each edge in dependence on the similarity between the nodes connected by the edge.

The step of calculating the transformation function preferably comprises determining the eigenvectors of.

$$A^T(L \otimes I_m)Aw = \lambda A^T(D \otimes I_m)Aw$$

where the dimensionality of the first space is m×n, the number of nodes of the first series is N, A is an (mN×n) matrix generated by arranging all the nodes of the first series in a column, $A=[A_1^T, A_2^T, \ldots, A_N^T]^T$; D is a diagonal matrix with $D_{ij}=\Sigma_j s_{ij}$; L=D−S is the Laplacian matrix; operator ⊗ is Kronecker product of matrix; and $I_m$ is an identity matrix of order m; and the transformation function is calculated in dependence on the determined eigenvectors. Most preferably the transformation function is calculated only independence on some of those eigenvectors, for example the first 2, 3, 4 or 5 eigenvectors.

The method may comprise defining a second transformation function that maps each of the nodes in the second multidimensional space on to a respective node in a third multidimensional space having a lower dimensionality than the second multidimensional space, in such a way that neighborhood relationships between nodes in the second multidimensional space are preserved between the respective nodes in the third multidimensional space. The method may comprise defining a second series of nodes in the third multidimensional space, each of the second series of nodes corresponding to one of the second set of nodes and its location in the third multidimensional space being defined in accordance with the transformation function. Then the clustering analysis may be performed on the nodes of the third multidimensional space.

The method may comprise, for at least some of the identified clusters, identifying an image of the video data associated with that cluster and outputting that image. Some of the clusters may be filtered so that images associated with them do not appear in the output.

The method may comprise: analyzing the video data to identify shots therein; and for at least some of the identified clusters, identifying a shot of the video data associated with that cluster and outputting the video of that shot. Some of the clusters may be filtered so that shots associated with them do not appear in the output.

BRIEF DESCRIPTION OF THE DRAWINGS

The present invention will now be described by way of example with reference to the accompanying drawings.

In FIGS. 2, 3, 5 and 6, the number below each image is the frame number for each representative frame depicting the scene. Shot boundaries are marked in using vertical lines for visualization.

DETAILED DESCRIPTION OF EXEMPLARY EMBODIMENTS

In the present system, a stream of video data, which can be considered to be made up of a series of images, is processed algorithmically to identify significant portions of it. Once identified, images from those portions, or other images or sub-clips of the video data identified by means of those portions can be compiled for use as an aid in browsing the original video stream.

The algorithmic processing involves applying one or more chosen pixel or feature metrics to each of the images that is to be processed, and based on the output of the metric(s) allocating the respective image to a node in a multidimensional space (i.e., to an array having a value for each dimension of the space). The nodes in the multidimensional space are then each subjected to a transformation function that reduces their dimensionality while preserving the neighborhood relationships between nodes. Thus nodes that are nearby in the multidimensional space are also nearby in the lower dimensional space after the transformation. The nodes in the lower dimensional space are then subjected to a clustering algorithm to identify clusters of nearby nodes. These are taken to represent significant portions of the original video, and an image from each cluster can be selected by reference to features of each image determined by one or more selected node(s).

The original video data may undergo a step of compression before the pixel or feature metric(s) are applied. The type of compression that is used can be chosen depending on the implementation, but could include selecting only every n-th frame from the original data or reducing the number of pixels in the frames by a linear or non-linear spatial sub-sampling operation.

The pixel or feature metrics can be selected depending on the implementation. They could include mapping of RGB colour image pixels, edge mappings, colour histograms and texture mappings. Preferably one of the dimensions of the multidimensional space represents the time or sequence of an image in the original video. The present system preferably makes use of an appearance-based image recognition technique.

The transformation function preferably comprises the steps of: constructing a graph representing the relationships between neighboring nodes of the multidimensional space, most preferably by forming edges representing the relationships between neighboring nodes; assigning a weight to each such relationship, preferably on the basis of the similarity between the nodes related by the relationship; deriving a mapping between nodes of the multidimensional space and the lower dimensional space; and mapping the nodes on to the lower dimensional space by means of that mapping. The mapping is preferably performed by means of at least some of the eigenvectors of equation (10) below. The whole transformation function is preferably the 2D-LPP function described below, but other functions having the property of maintaining neighbor relationships as discussed above could be used. The transformation function could be applied twice in succession, one application being orthogonal to the other, as discussed below.

The clusters could be filtered to achieve a desired number of output points or a desired level of significance of output points.

There are a number of ways to select the images or video clips that are to form the ultimate output. If an image is required then it could be the central image of each cluster, the earliest image of each cluster in order in the video stream or the earliest image of each shot that is represented by a cluster. If a video clip is required then it could be a clip that surrounds the frame represented by an image as selected above, a clip that spans the images of a cluster, or a clip that spans a shot that is represented by a cluster. Other ways of selecting images or clips could be chosen. The output could be analyzed statistically instead of providing images or clips. Such analysis could yield information about the maker of the video or the style of the video.

Thus, by exploiting the temporal constraint or sequential correlations inherent in a video (as compared to random static images) and the (optional) use of two 2D-LPP processes, an image frame in the original extremely high (m×n)-dimensional data space $I^{m \times n}$ can be transformed into a feature point in the small (d×d)-dimensional Euclidean subspace $f^{d \times d}$, with (d<<m) and (d<<n). This transformation has the property that visually similar images in $I^{m \times n}$, will stay as close in $f^{d \times d}$ and the intrinsic geometry and local structure of the original data are preserved. This feature subspace will then lend itself easily to a conventional data clustering analysis method to identify suitably scattered feature clusters. Finally, the output storyboard of the video can be created, comprising those image frames whose features are closest to the centroid of each cluster, subject to satisfying certain cluster-validity constraints and other user requirements (e.g. size of storyboard, most stable or most dynamic content, etc). Given additional information (e.g. shot boundaries and camera motion), the system can also output a condensed video summary clip.

Figure 1A:
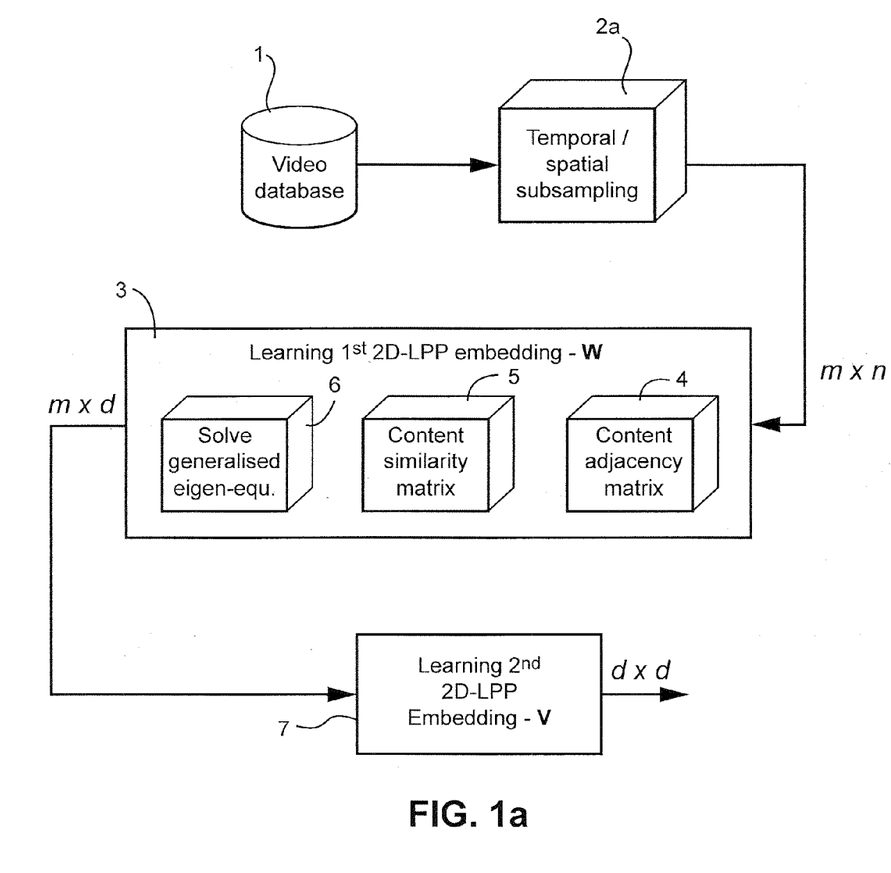
FIGS. 1a and 1b are schematic diagrams illustrating a video abstraction approach based on a 2D-LPP method.
Figure 1B:
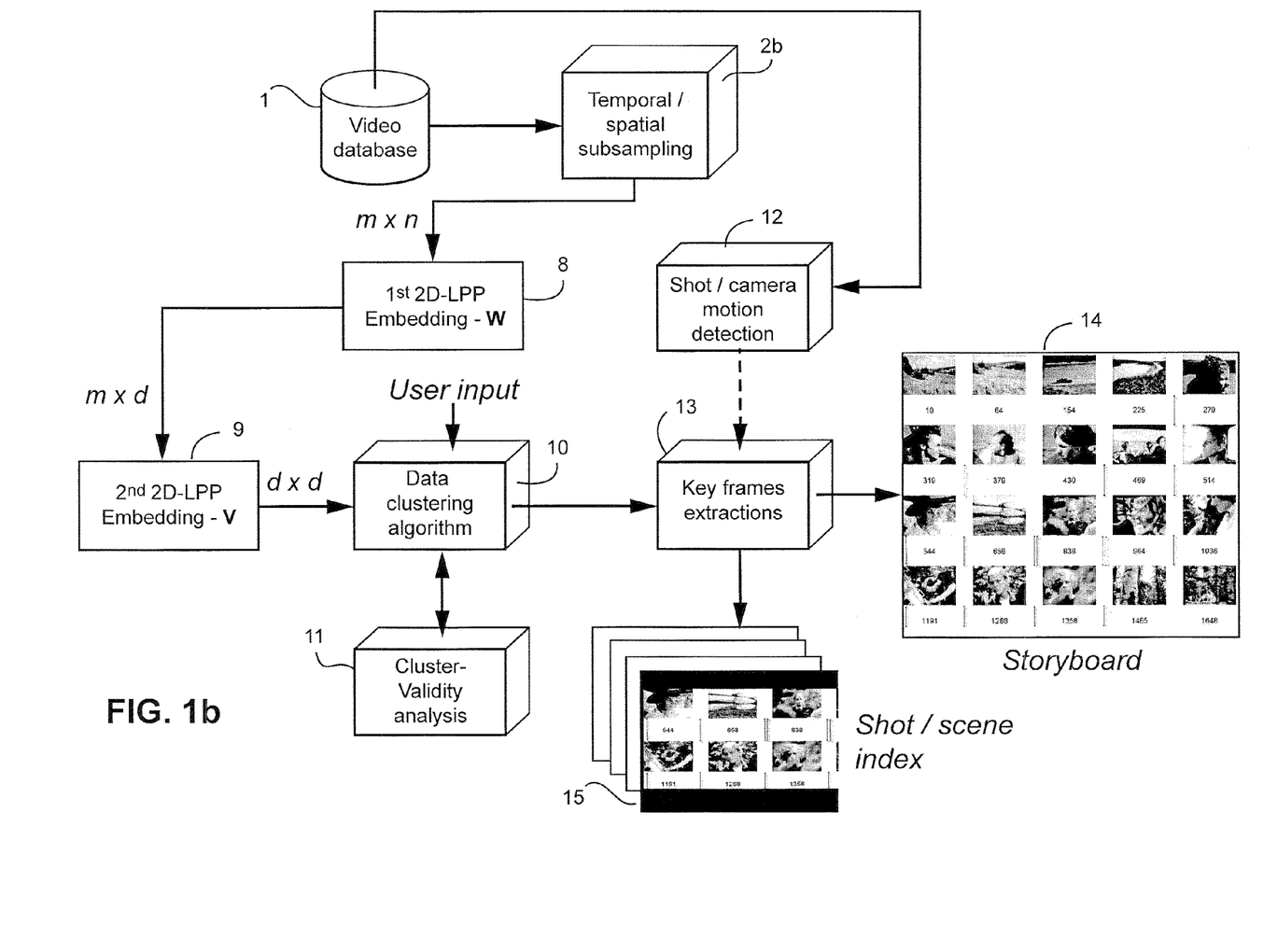

FIGS. 1a and 1b are schematic diagrams illustrating the main blocks in a video abstraction technique employing a 2D-LPP (2-dimensional locality preserving projection) method.

In a first stage, as illustrated in FIG. 1a, two 2D-LPP transformation matrices (sometimes called subspace embeddings) are learned in tandem. In the second stage, as illustrated, in FIG. 1b those transformation matrices are applied in tandem to transform input data of dimensions m×n first to feature data of dimensions m×d and then to feature data of dimensions d×d. It is preferred that d is 5 or less or alternatively 3 or less. This reduced dimensionality data is then analysed by a clustering algorithm to detect the significant passages in it.

As illustrated in FIG. 1a, the input video sequence stored in a data store 1 first undergoes a temporal and spatial sub-sampling process (block 2a) in order to remove data redundancy and make the subsequent subspace learning sequence more efficient, especially if the input video sequence is long.

The temporal sub-sampling can conveniently be done by removing some of the frames of the video sequence, for example removing all but every 5th or 10th frame. The level of data reduction at this stage can be selected depending on characteristics of the video sequence: for instance depending on the average shot length for the genre of video in question. Average shot lengths could be determined empirically in advance for a range of genres. Instead of removing a certain proportion of normal frames, other method could be used. For example, in the case of a compressed MPEG-½ video stream the process could involve selecting just the I frames of the input video sequence.

The spatial sub-sampling can conveniently be done by reducing the resolution of the input video stream. This can, for example, result in an image resolution of QCIF or sub-QCIF quality as long as enough visually distinctive appearance is retained that the subsequent steps can be performed satisfactorily. During this process other useful video descriptor information, can if necessary be extracted from the original video. This may include, for example, shot boundaries and camera motions. This data can later be used to index the images in the eventual storyboard as well as to help produce a condensed dynamic video clip.

The output of the sub-sampling block 2a, which will be an image sequence of N frames, can be considered as a set of N data points drawn from an (m×n)-dimensional random image space $I^{m \times n}$. This is provided as input to the first 2D-LPP subspace learning block 3, and is used as the basis for learning the first 2D-LPP subspace and deriving the required transformation matrix. The 2D-LPP subspace learning block 3 includes the three sub-blocks. Block 4 builds a content adjacency graph, or a sparse binary matrix, based on the content distance metric between pair-wise images that also satisfy neighborhood size and a temporal distance (in frame) constraint. Block 5 computes a similarity value for each pair of connected nodes using a well-defined similarity measure. Block 6 uses the outputs of blocks 4 and 5 to solve a 'generalized eigen-equation problem' for eigenvectors that form the transformation matrix. The result of the 2D-LPP subspace learning process performed in block 3 is that each a projection is learned that can be used to transform the original (m×n)-dimensional image in the output from block 2a into an (m×d)-dimensional subspace $F^{m \times d}$ of a feature matrix, where d<n.

In block 7 steps analogous to steps 4, 5 and 6 are performed to learn the second 2D-LPP projection. The next step (block 8) is to further reduce the dimensionality of this feature space by learning a second 2D-LPP from this feature data set to generate a projection that can be used to obtain a new feature space of merely (d×d)-dimension $f^{d \times d}$.

The significance of these 2D-LPP projections is that they allow the original space (which may for example be of dimensions 84×72) to be transformed to a much reduced feature subspace (which may for example be of dimensions 3×3) whilst preserving the crucial locality, discriminative and structure information of the original image space. Such a reduced feature subspace lends itself to more simple and effective data analysis in subsequent processing steps.

After the projections have been learned, as shown in FIG. 1a, they are applied as shown in FIG. 1b. As illustrated in FIG. 1b, the input video sequence stored in the data store 1 first undergoes a temporal and spatial sub-sampling process (block 2b) similar to and preferably the same as that of block 2a. (In practice, this step does not need to be repeated)

The two learned 2D-LPP projections are applied in turn to the output of block 2b to reduce the (m×n)-dimensional data output from block 2b first into an (m×d)-dimensional subspace $F^{m \times d}$ of a feature matrix, where d<<n and then to a feature subspace of merely (d×d)-dimension $f^{d \times d}$.

After obtaining the feature data set $f^{d \times d}$, the next step (block 10) is to identify representative data clusters in this subspace. This can readily be done with a classic data clustering method, such as a K-means method or a mixture-of-Gaussian method. For simplicity purpose, the K-means method is adopted in the present example. Once the algorithm is converged and a number of clusters have been identified, the feature data point (or its corresponding image) that is closest to the centroid of each cluster is chosen as the key frame of that data cluster. (Block 13). The selected key frames are then sorted according to their frame index numbers so as to put them in the order in which they appeared in the original video stream, to form a final sequential storyboard. (Step 14). Additionally, given the shot boundaries that can be automatically generated from the original video (block 12), each selected key frame can be associated with the video stream for that shot, so that the dynamic video content of the shot in which the key frame appeared can be extracted and presented for viewing (block 15).

The number of data clusters that are to be identified can be determined in a number of ways. First, a user may want to choose the number of clusters according to his or her preference as to how many representative scenes are to appear in the storyboard. Second, the number of clusters can be determined automatically based on basic attributes of the input video file, for example one or more of the number of shots, the average shot duration, the camera motion type associated or predominantly associated with each shot (e.g. pan, zoom, dolly), the genre of the video file and the total duration of the video file. For this purpose, an appropriate empirically-determined formula can be worked out in advance. Third, the number of clusters can be determined automatically based on a cluster-validity analysis similar to that discussed in reference [5] and [15]. (Block 11). In the latter case, the output can be expected to correspond to semantically good scene segmentations.

Each cluster is preferably validated (block 11) to ensure that it represents an aggregation of visual content that is meaningful in the context of the original input video. To achieve this, each cluster can be characterized by measures such as standard deviation and relative cluster weight (number of frames in the cluster in question as a proportion of the number of frames in the whole video).

The input to the 2D-LPP subspace learning block 3 can be in monochrome or grey-level (either original or as converted from colour images), or may include other pixel- or feature-based representations such as RGB colour image pixels, edge mappings, colour histograms and textures. Each will involve different computational complexity. Certain forms of representation may work better with certain types of content: for example with certain types of camera and object motion activities.

The algorithms used for the steps of the two-dimensional locality preserving projection (2D-LPP) will now be discussed.

Consider a set of N sample images $A_1, A_2, \ldots, A_N$ taken from an (m×n)-dimensional random image space. Due to the high dimensionality of this image space, it is difficult to perform conventional analysis algorithms directly for image classification/recognition tasks. So the ability to perform effective dimensionality reduction to derive a subspace while maintaining the characteristics of, the original space structures is particularly important.

From the same starting point as 2D-PCA, one can design a linear transformation that maps the original (m×n)-dimensional image space onto an m-dimensional feature space. Let w be an n-dimensional unitary column vector. The method described here is to project each $A_i$, an (m×n) image matrix, onto w by the following transformation:

$$x_i = A_i w, \; i = 1, 2, \ldots, N, \quad (9)$$

Then we obtain the m-dimensional projected feature vector $x_i$ for each image $A_i$. The critical issue now is the selection of a meaningful projection vector w that should lead to the highest recognition results of the original image space.

The two-dimensional locality preserving projection (2D-LPP) is a two-dimensional expansion of the LPP method (see reference [7]). The procedure of the 2D-LPP algorithm can be stated formally as follows (see reference [3]):

1. Constructing the Nearest Neighbor Graph

Let G denote a graph with N nodes, its ith node representing image $A_i$. An edge is created between nodes i and j if $A_i$ and $A_j$ are considered to be "close". There are several methods to measure the "closeness". Here are two:

(a) k-nearest neighbors. Nodes i and j are connected by an edge if i is among the k nearest neighbors of j or j is among the k nearest neighbors of i.

(b) ε-neighborhoods. Nodes i and j are connected if $\|A_i - A_j\| < \epsilon$, where the metric $\|*\|$ between the two matrices is just the Euclidean distance between their two vector notations in $R^{m \times n}$.

Note that for pattern classification purpose, it is advantageous to incorporate label information (if known) of training samples to improve the discriminant performance, which can be done by restricting the k-nearest neighbors of each image to be from the same class.

2. Choosing the Weights

If there is an edge between nodes i and j, then a similarity weight $S_{ij}$, will be attached to it, otherwise a value 0 is assigned, giving rise to a sparse symmetric (N×N) similarity matrix S. The similarity weight $S_{ij}$ can be:

(a) Binary. $s_{ij} = 1$, or (b) Heat kernel. $S_{ij} = \exp\{-\|A_i - A_j\|/t\}$ where t is a suitable constant. In the present example embodiment, t is chosen to be a constant multiplied by the maximal distance of pair-wise neighboring images.

3. Eigenmap

Compute the eigenvectors and eigenvalues for the generalized eigenvalue problem:

$$A^T(L \otimes I_m) A w = \lambda A^T (D \otimes I_m) A w \quad (10)$$

where A is an (mN×n) matrix generated by arranging all the images in a column, $A = [A_1^T, A_2^T, \ldots, A_N^T]^T$; D is a diagonal matrix with $D_{ii} = \Sigma_j s_{ij}$; L=D−S is the Laplacian matrix; Operator $\otimes$ is Kronecker product of matrix; $I_m$ is an identity matrix of order m.

Let $w = [w_1, w_2, \ldots, w_d]$ and $w_k, k=1, 2, \ldots, d$ be the first d unitary orthogonal solution vectors of equation (10) corresponding to the d smallest generalised eigenvalues in the order $0 \leq \lambda_1 \leq \lambda_2 \leq \ldots \lambda_d$. These eigenvalues are nonnegative because both the matrices $A^T(L \otimes I_m)A$ and $A^T(D \otimes I_m)A$ are symmetric and positive semi-definite. Thus, the embedding is as follows:

$$A_i \rightarrow X_i = A_i W, \; i=1, 2, \ldots, N \quad (11)$$

where $X_i = [x_i^{(1)}, x_i^{(2)}, \ldots, x_i^{(d)}]$ is an (m×d) feature matrix of $A_i$, and W is the (n×d) transformation matrix.

Each image $A_i$ can now be mapped into a feature matrix $X_i$ in the determined 2D-LPP subspace. The distance between any two feature matrices, $X_i = [x_i^{(1)}, x_i^{(2)}, \ldots, x_i^{(d)}]$ and $X_j = [x_j^{(1)}, x_j^{(2)}, \ldots, x_j^{(d)}]$, can be defined as, $$d(X_i, X_j) = \sum_{k=1}^{d} \|x_i^{(k)} - x_j^{(k)}\|. \quad (12)$$

In the case of image (e.g., face) recognition, a simple nearest neighbour or K-NN classifier can be used. Assuming that $X_i$, i=1, 2, ..., N are feature matrices of the training images, $A_i$, i=1, 2, ..., N, and each image has a class (identity) label $C_k$. Given a test image $A_0$ and its feature matrix $X_0=A_0W$, it is suitably classified as belonging to $A_0 \in C_k$, if and only if $d(X_0,X_j)=\min$, $d(X_0,X_i)$ and $A_j \in C_k$.

In the case of video abstraction in the present example embodiment, as described above a second 2D-LPP subspace learning is carried out on the (m×d) feature matrix data set $X_i^T$. In the same way as discussed above, one can obtain the embedding:

$$X_i^T \rightarrow Y_i = X_i^T V, i=1,2,\ldots,N$$

where $Y_i = [y_i^{(1)}, y_i^{(2)}, \ldots, y_i^{(d)}]$ is an (d×d) feature matrix, and V is the (m×d) transformation matrix.

A data clustering algorithm such as a K-means algorithm can be used to find desired number of feature clusters using the distance metric given in equation (12).

Two specific examples of the analysis described above will now be discussed.

Example 1

Structured Video

Figure 2:
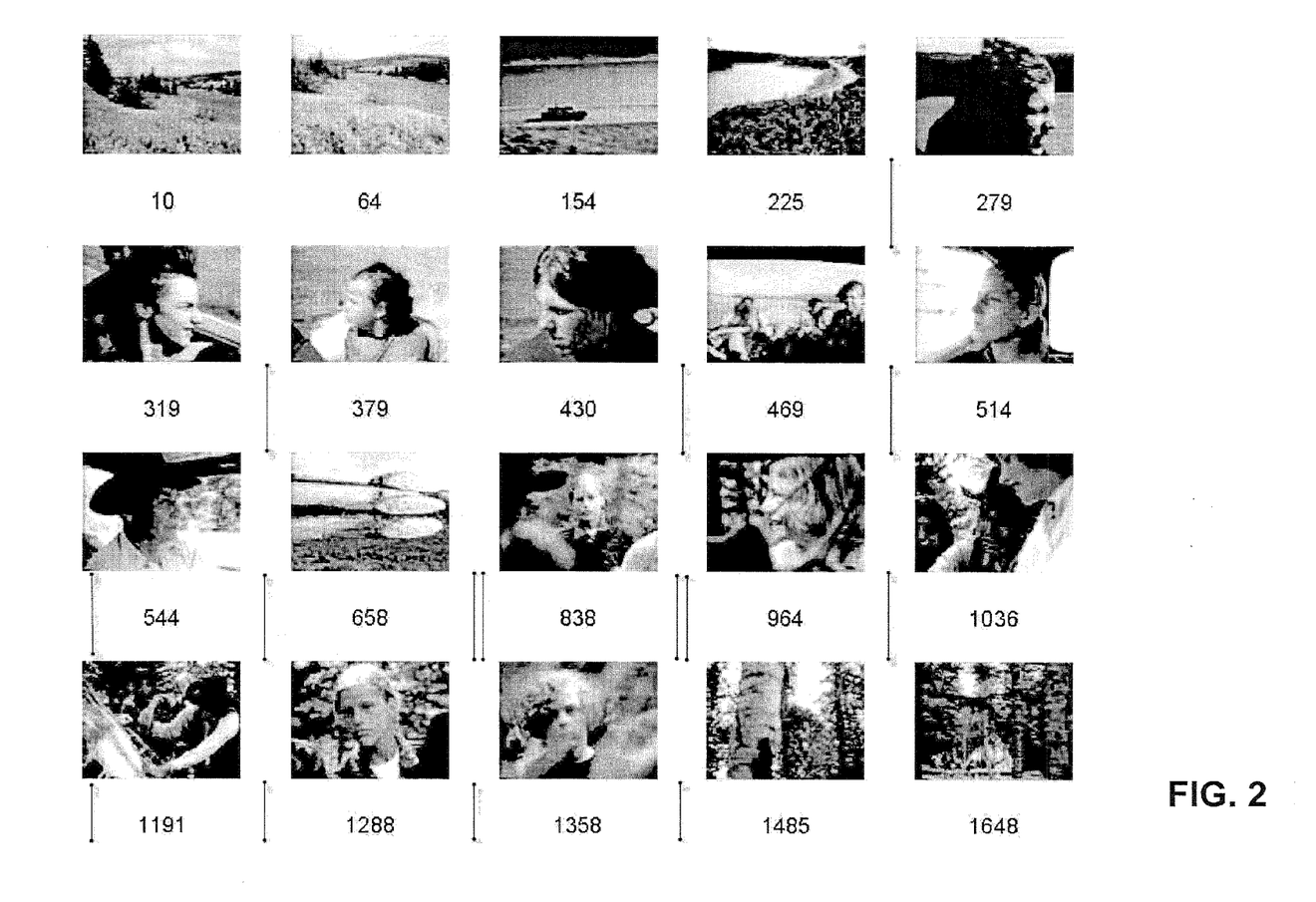
FIG. 2 shows the manually created storyboard of the 'New Indians Segment 01' video clip.

A video clip of the documentary 'New Indians, Segment 01', available from The Open Video Project site (http://www.open-video.orq), was analyzed. It is a video in MPEG-1 video about 56 seconds long, at a 30 fps sampling rate thus containing 1,686 images each of size 320×240 pixels. The video as available from The Open Video Project includes a manually created storyboard of 20 images, as shown in FIG. 2. The video clip is characterized as containing the amount of 'medium motion' (of camera and object movements).

A manual inspection of the video shows that it consists of 16 shots characterized by shot number and starting frame as follows: [1, 261], [262, 363], [364, 447], [448, 493], [494, 536], [537, 594], [595, 703], [704, 798], [799, 866], [867, 899], [900, 983], [984, 1189], [1190, 1256], [1257, 1328], [1329, 1373], [1374, 1686]. In the manually created storyboard, however, some shots have one or more frames to represent its visual content due to rapid changes in content caused by fast camera motions, while others have no associated representative frames at all due to their very short duration.

The video was temporally sub-sampled by a factor of 10, resulting in a data set of 168 images. The image frame size was then reduced to the resolution of 80×60. These samples were used to learn the proposed two-dimensional locality preserving projection (2D-LPP) subspace twice, onto which each frame was projected to obtain a data set of new feature images. In constructing a nearest neighbor graph, k=3 was used; and the d=3 eigenvectors were adopted, meaning that the dimensionality of the final feature subspace was 3×3. The K-means clustering method was then applied to cluster this feature data set. The centroid of each cluster was selected as the key frame to be retained in the automatically created storyboard. For visual comparison with the manually created storyboard, the number of clusters was chosen to be 20.

Figure 3:
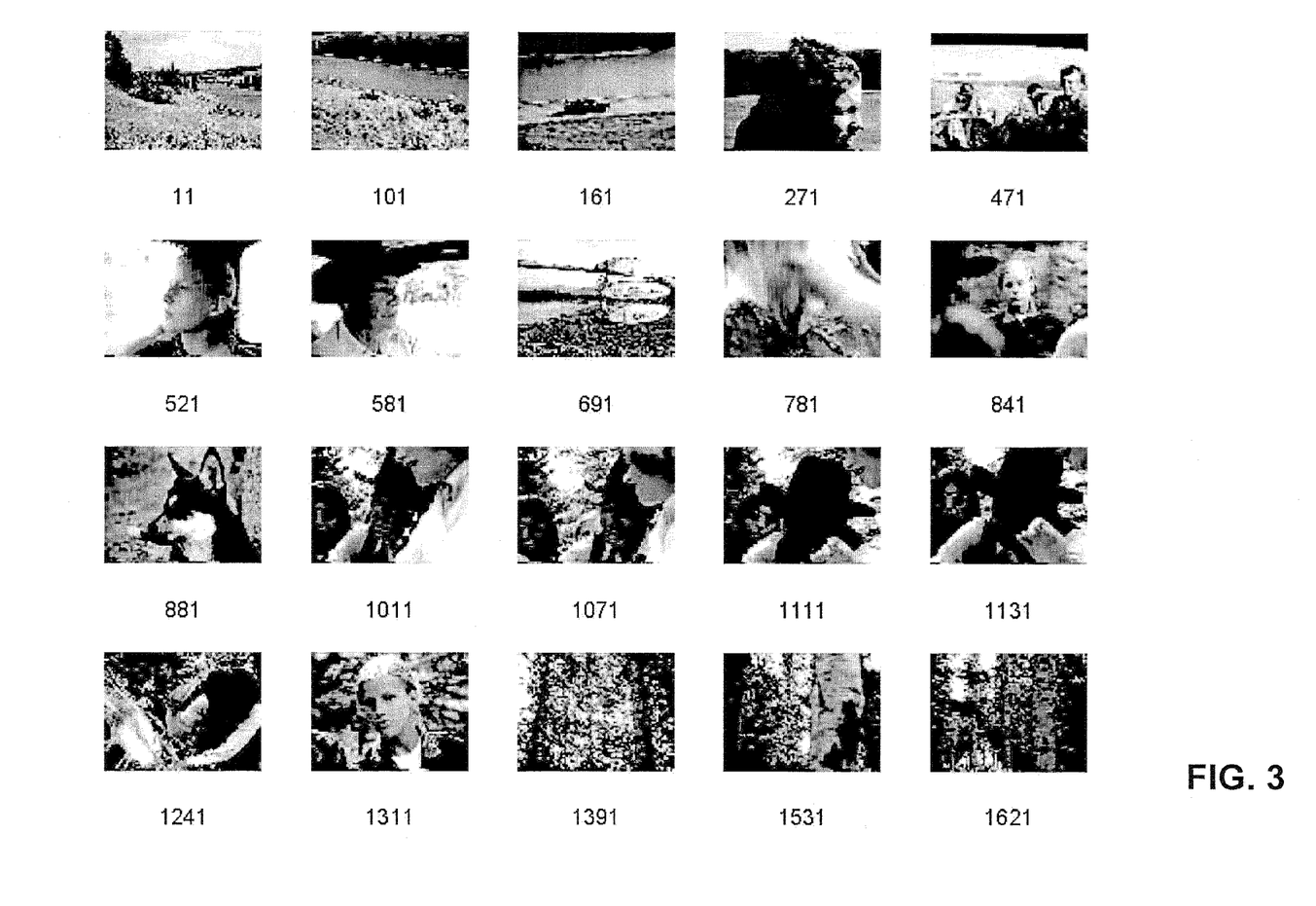
FIG. 3 shows an automatically created storyboard of the 'New Indians Segment 01' video clip.

FIG. 3 presents the result of this method. It can be seen from the figure that the automatically generated result is comparable with the manually generated storyboard. It can be observed that the automatically generated storyboard misses some frames that appear in the manually generated storyboard, such as frame number 379, 430 and 1358. The automatically generated storyboard contains some visually redundant key frames, such as frames 1011, 1071 and 1111, 1131. However, the automatically generated storyboard also produces some interesting key frames that are not present in the manually generated storyboard, such as frames 781, 881 and 1111. Although these frames are not included in the manually created storyboard, they are nevertheless very interesting and informative.

Example 2

Home Video

As compared with the analysis of professionally made videos, the analysis of home videos is considered a difficult task. Reasons for this include the fact that home video typically has no dialogue, it typically has unstable and handheld camera motion, it typically suffers from poor and natural environment lighting, and the shot duration and the way shots are presented do not normally have embedded semantics so it does not have rhythms.

Figure 4:
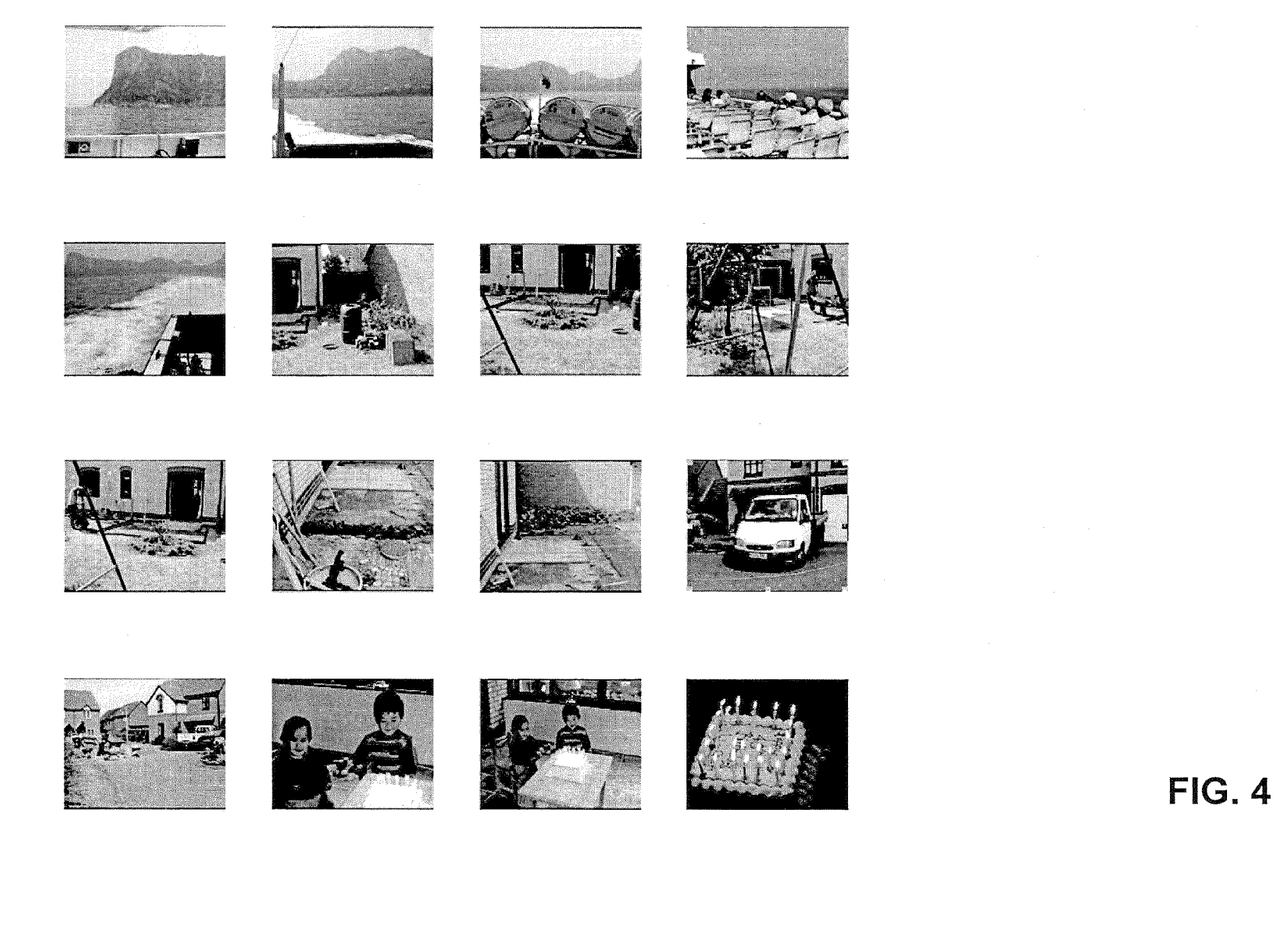
FIG. 4 shows a manually created storyboard for a home video segment.

The home video analysed in this example was a 4 minute long MPEG-1 clip, at the sampling rate of 25 fps, containing 5,995 frames of size 352×288 pixels. There are 9 camera shots contained in this video segment plus one accidentally triggered dark shot, the shot boundaries are: [1, 514], [515, 672], [673, 1033], [1034, 1437], black, [1468, 2165], [2166, 3862], [3863, 4250], [4251, 4810], [4811, 5994]. The original author created a manual storyboard, which describes the meaningful moments/scenes that were meant to be captured, given the size restriction of 20 images only. This is shown in FIG. 4.

The video was sub-sampled by a factor of 10, resulting in a data set of N=600 frames, and each frame size was reduced to 88×72 pixels. The neighborhood size for initial adjacency graph construction was taken as k=3. For comparison purpose, it was chosen to generate storyboards of different sizes as well as to use a different number of eigenvectors for the process of 2D-LPP learning.

Figure 5A:
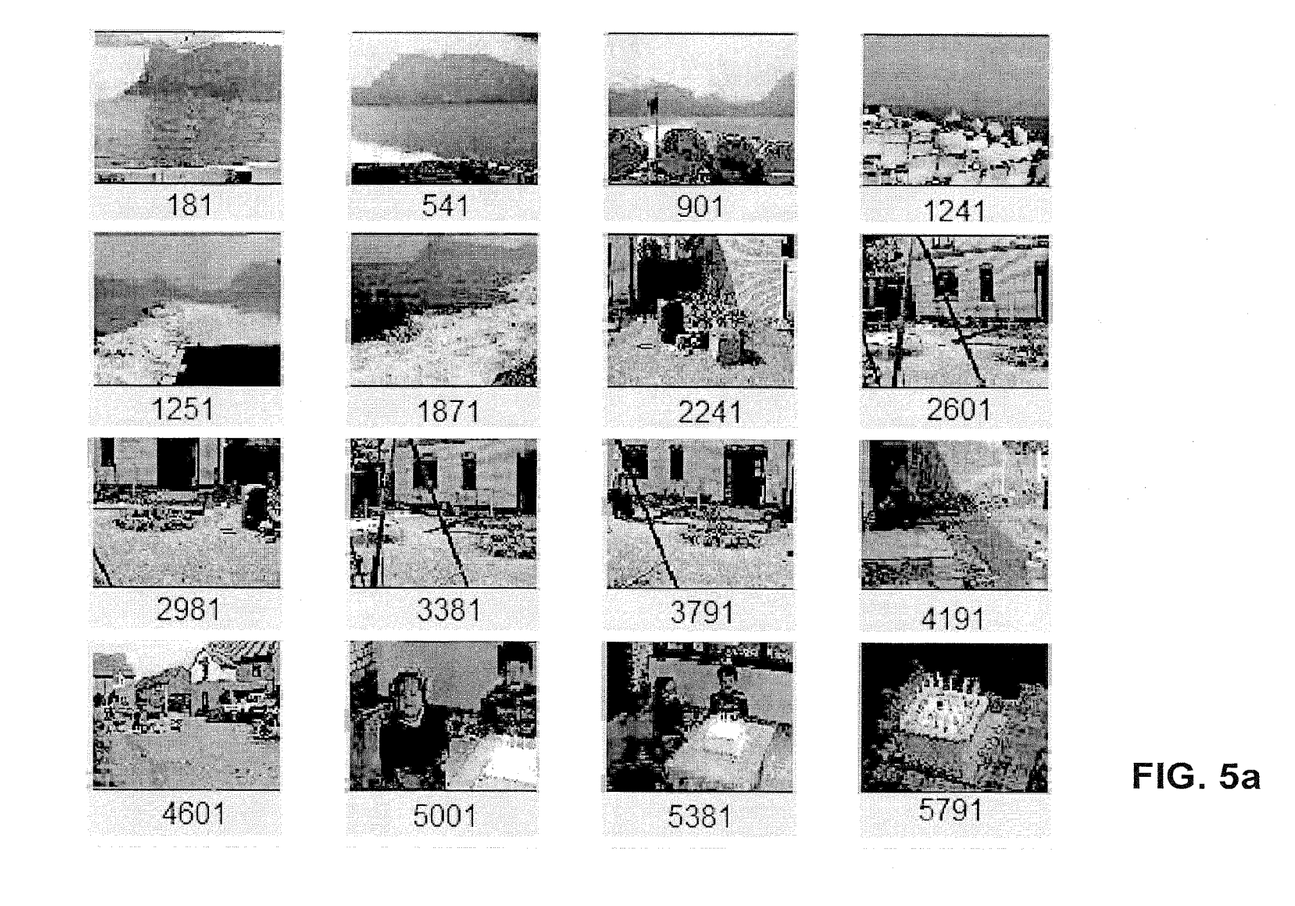
FIGS. 5 and 6 show automatically created storyboards for the home video segment.
Figure 5B:
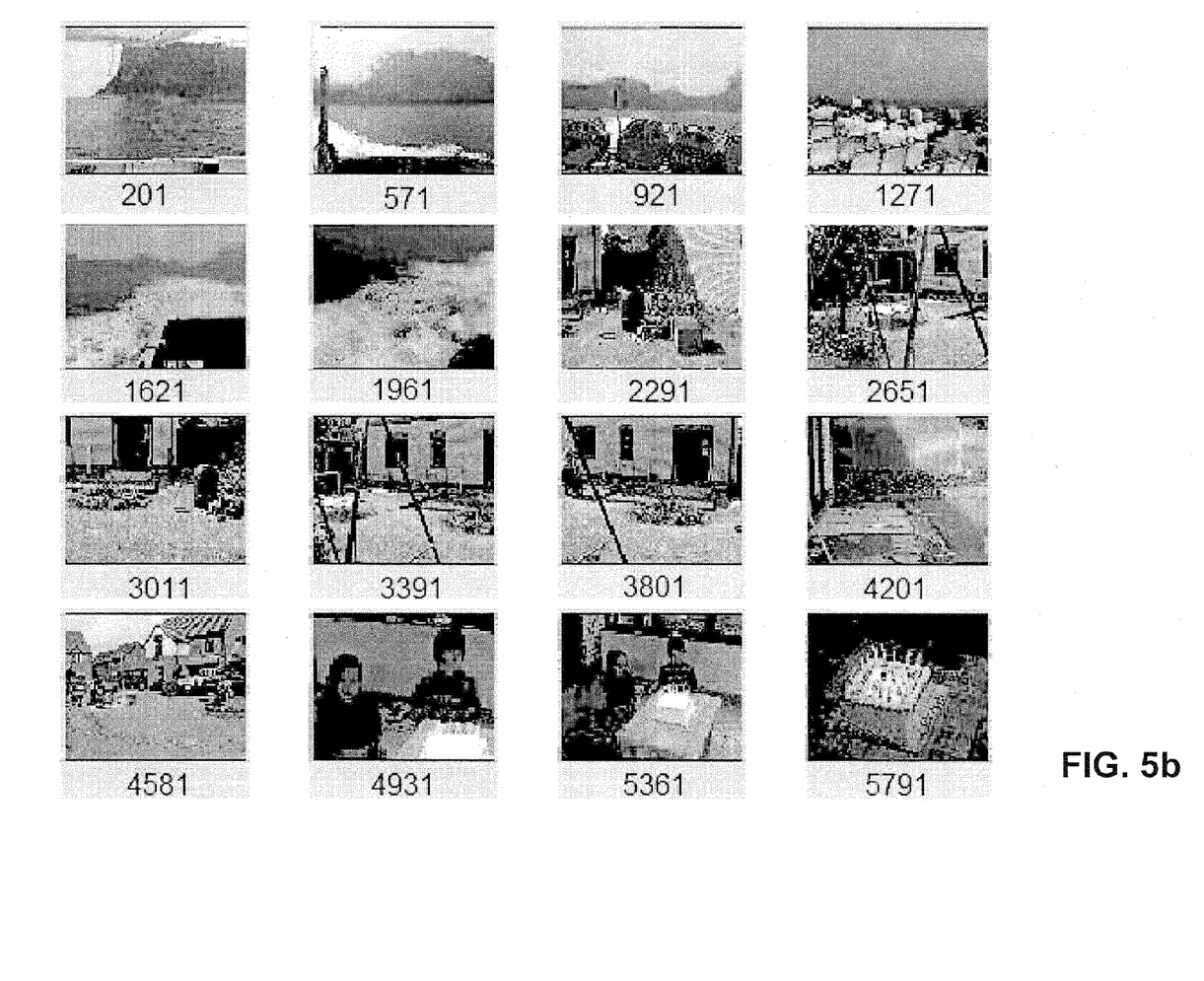

FIG. 5 shows the two storyboards generated with a size NC=20: the number of eigenvectors used is d=3 for storyboard a and d=5 for storyboard b, respectively. The shot boundaries are marked in order to demonstrate the key frame distribution. It can be observed that the two storyboards employing different size of feature subspace (i.e. 3×3 feature matrix and 5×5 feature matrix, respectively) are almost the same. By carefully comparing the storyboards of FIG. 5 with the manually generated storyboard of FIG. 4 it can be seen that the automatically generated video abstraction is very similar to the manual abstraction, capturing most of the memorable moments and scenes selected by the author. This is especially significant given the dimensionality reduction from the original 88×72 to a size of merely 5×5 or 3×3. The two scenes that are present in the manually generated storyboard but absent from the automatically generated storyboard are those representing 'a close-up of the conservatory base under construction' and 'a white van in front of the house'. Analysis showed that the reason for the absence of these scenes from the automatically generated storyboard was that in both cases the handheld camera moved fast (saccade) through the scene without actually dwelling on (fixation) the spot for long, thus in both case there was insufficient data available for automated analysis and clustering for these spots. It could be argued, from a visual attention point of view, that these two scenes are of less interest and are less significant because they do not follow the implicit rules of 'attention and recording' (see reference [4]).

Figure 6A:
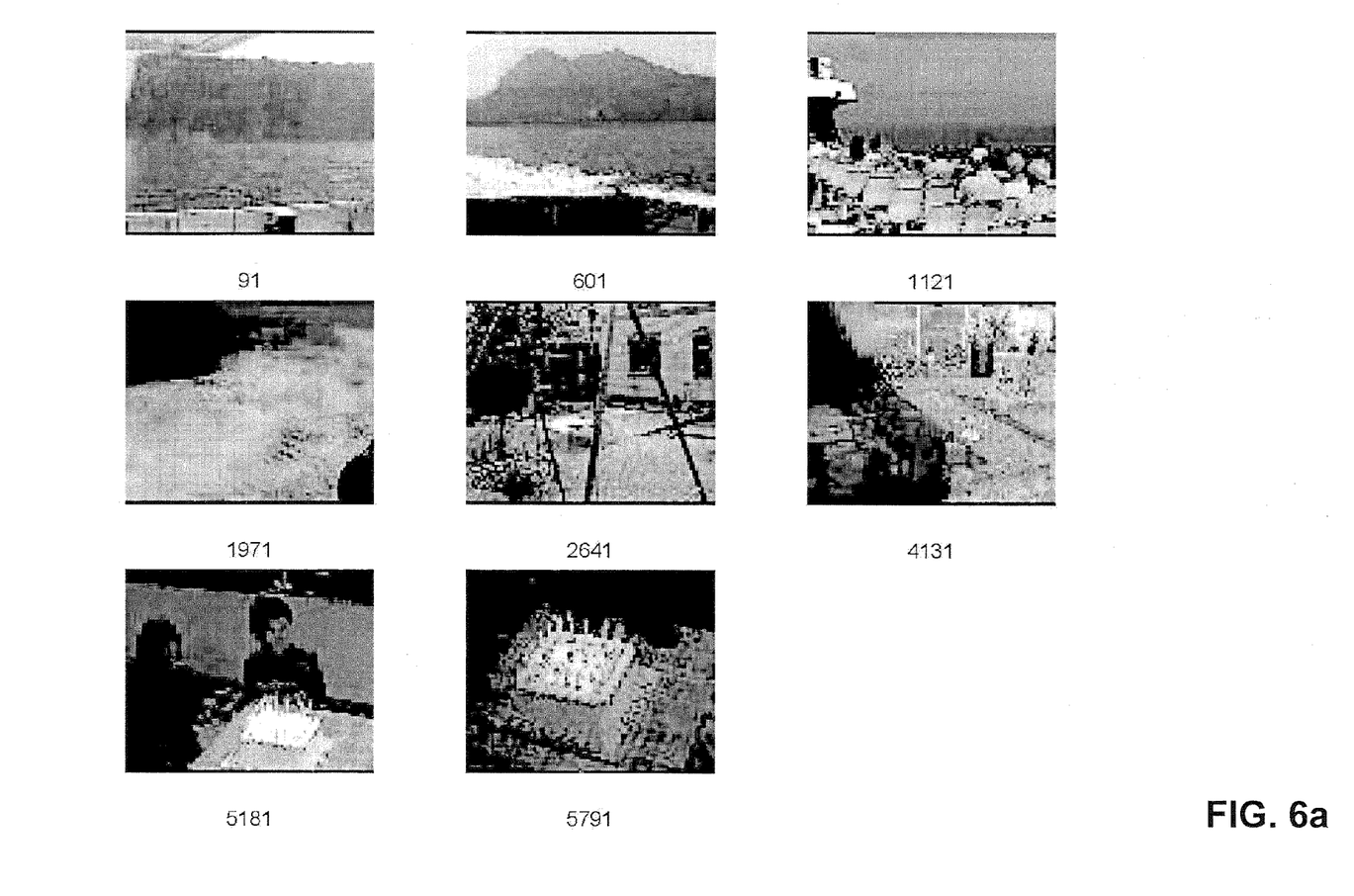
Figure 6B:
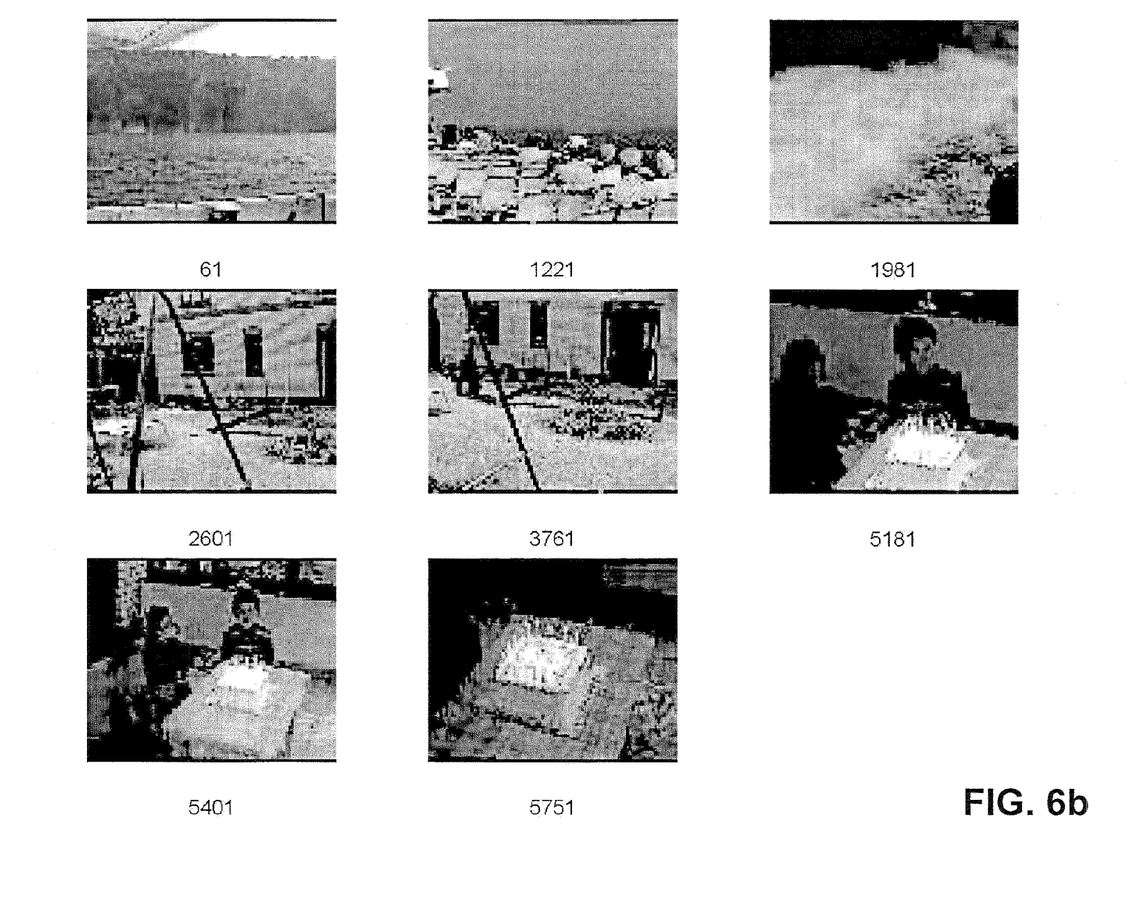

FIG. 6 shows the video abstraction result for the same home video when the required storyboard size is restricted to NC=8, while the number of eigenvectors used is d=3 for (a) and d=5 for (b). It can be seen that the result obtained with 3 eigenvectors is visually slightly better than the one with 5 eigenvectors in the 2D-LPP subspace.

Experiments on various videos (e.g., home videos, documentaries, etc) have shown that the present method offers special advantages in revealing sub-shots of a long video shot (due to camera saccade and fixation) in typical home videos and collapsing repetitive scenes like interview and dialogue often seen in a movie or documentary.

In the present video abstraction method, the original images can come directly from the visual content of a video under study, albeit at a reduced temporal and spatial resolution. This differs from the tasks of static image/face recognition normally conducted in a subspace leaning paradigm, the temporal information is vital in video abstraction and scene segmentation. An explicit consideration of this is given when learning the 2D-LPP in the construction of the initial content adjacency graph and similarity matrix, which means that even if a pair of images appears similar visually but are spaced wide apart temporally, they are still considered not to be related, i.e., with no edge in the graph joining them. By doing so, the temporal structure of the original video is preserved.

The method described above could be implemented by any suitable hardware, including dedicated and multi-purpose computing equipment. Computing equipment for implementing the method preferably includes a program store for storing program instructions defining processing steps for performing the method and a processing device such as a central processing unit for executing those instructions. A program defining the method may be stored on a data carrier. The program itself or as stored on a data carrier may be a product.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

REFERENCES

[1] P. N. Belhumeur, J. P. Hespanha, and D. J. Kriegman, "Eigenfaces vs. Fisherfaces: Recognition using class specific linear projection," IEEE Trans. on Pattern Analysis and Machine Intelligence (PAMI), 19(7):711-720, 1997.

[2] C. J. C. Burges, "Geometric methods for feature extraction and dimensional reduction—a guided tour," In The Data Mining and Knowledge Discovery Handbook, 59-92, 2005.

[3] S. Chen, H. Zhao, M. Kong, and B. Luo, "Two-dimensional lpp for image recognition," Proc. of IEEE 2005 Intl. Conf. on Intelligent Computing, 23-26, Hefei, China, 2005.

[4] D. Gatica-Perez, N. Triroj, J.-M. Odobez, A. Loui, and M.-T. Sun, "Assessing scene structuring in consumer videos," Proc. of CIVR '04, Dublin, 2004.

[5] A. Hanjalic and H. Zhang, "An integrated scheme for automated video abstraction based on unsupervised cluster-validity analysis," IEEE Trans. on CSVT, 9(8):1280-1289, December 1999.

[6] X. He and P. Niyogi, "Locality preserving projections," In Advances in Neural Information Processing Systems 16, MIT Press, Cambridge, Mass., 2004.

[7] X. He, S. Yan, Y. Hu, P. Niyogi, and H. Zhang, "Face recognition using laplacianfaces," IEEE Trans. on PAMI, 27(3):328-340, 2005.

[8] P. Indyk, "On approximate nearest neighbors in non-euclidean spaces," Proc. of 39th Annual Symposium on Foundations of Computer Science (FOCS '98), November, 1998, Palo Alto, Calif., 148-155.

[9] A. K. Jain, M. N. Murty, and P. J. Flynn, "Data clustering: a review," ACM Computing Survey, 31(3), 264-323, 1999.

[10] A. Joshi, S. Auephanwiriyakul, and R. Krishnapuram, "On fuzzy clustering and content-based access to networked video databases," Proc. of the Workshop on Research Issues in Database Engineering (RIDE '98), page 42, Washington, D.C., USA, 1998. IEEE Computer Society.

[11] M. Li and B. Yuan, "2d-1da: A statistical linear discriminant analysis for image matrix," Pattern Recognition Letters, 26(5):527-532, April 2005.

[12] Y. Li, T. Zhang, D. Tretter, "An overview of video abstraction techniques," Tech. Report HPL-2001-191, July 2001, Imaging Systems Laboratory, HP Laboratories Palo Alto.

[13] C.-C. Lo and S.-J. Wang, "A histogram-based moment-preserving clustering algorithm for video segmentation," Pattern Recognition Letters, 24(14):2209-2218, 2003.

[14] A. Ng, M. I. Jordan, and Y. Weiss, "On spectral clustering: analysis and an algorithm," in Proc. of NIPS, Vancouver, December 2001.

[15] J. M. Odobez, D. Gatica-Perez, and M. Guillemot, "On spectral methods and the structuring of home videos," IDIAP-RR 02-55, November 2002. (ftp://ftp.idiap.ch/pub/reports/2002/rr02-55.pdf)

[16] L. K. Saul and S. T. Roweis, "Think globally, fit locally: Unsupervised learning of low dimensional manifold," Journal of Machine Learning Research, 4:119-155, 2003.

[17] J. Vendrig and M. Worring, "Systematic evaluation of logical story unit segmentation," IEEE Trans. on Multimedia, 4(4), Dec. 2002.

[18] J. Yang, D. Zhang, A. F. Frangi, and J.-Y. Yang, "Two-dimensional pca: A new approach to appearance-based face representation and recognition," IEEE Trans. on PAMI, 26(1):131-137, 2004.

[19] D. Zhang, C.-Y. Lin, S.-F. Chang, and J. R. Smith, "Semantic video clustering across sources using bipartite spectral clustering," Proc. of ICME '2004, 117-120, 2004, Taiwan.

[20] X. Zheng, D. Cai, X. He, W. Y. Ma, X. Lin, "Locality preserving clustering for image database," Proc. of the 12th annual ACM international conference on Multimedia, 2004.

What is claimed is:

1. A method for processing video data defining a series of images, comprising: configuring and using at least one digital data processor and associated memory to effect the steps of:
defining a first series of nodes in a first multidimensional space, each of the first series of nodes corresponding to an image of the series of images and its location in the first space being defined in dependence on appearance components of the respective image;

defining a transformation function that maps each of the nodes in the first multidimensional space on to a respective node in a second multidimensional space having a lower dimensionality than the first multidimensional space, in such a way that neighborhood relationships between nodes in the first multidimensional space are preserved between the respective nodes in the second multidimensional space;

defining a second series of nodes in the second multidimensional space, each of the second series of nodes corresponding to one of the first set of nodes and its location in the second multidimensional space being defined in accordance with the transformation function; and performing a clustering analysis in dependence on the nodes of the second multidimensional space to identify clusters of nodes therein;

wherein the step of defining the transformation function comprises:

defining a graph representing the relationships between neighboring nodes of the first space;

assigning a weight to each such relationship; and calculating the transformation function in dependence on the determined mapping.

2. A method as claimed in claim 1, wherein the location of each point in the first space is defined by means of a pixel and/or feature mapping algorithm performed on a respective one of the images.

3. A method as claimed in claim 1, wherein one of the dimensions in the first multidimensional space represents the time or sequence in the original video of the image corresponding to each of the first series of points.

4. A method as claimed in claim 1, wherein the step of defining a graph comprises:

identifying pairs of the first series of nodes that collectively satisfy a pre-defined neighborhood condition as being neighboring nodes; and defining edges in the first space that connect the neighboring nodes.

5. A method as claimed in claim 4, wherein the neighborhood condition is determined by pre-processing of training data.

6. A method as claimed in claim 4, wherein the step of assigning a weight to each relationship comprises assigning a weight to each edge in dependence on the similarity between the nodes connected by the edge.

7. A method as claimed in claim 6, wherein the step of calculating the transformation function comprises determining the eigenvectors of:

$$A^T(L \otimes I_m)Aw = \lambda A^T(D \otimes I_m)Aw$$

where the dimensionality of the first space is m×n, the number of nodes of the first series is N, A is an (mN×n) matrix generated by arranging all the nodes of the first series in a column, $[[A=[\ ]]A_1^T, A_2^T, \ldots, A_N^T]^T$; D is a diagonal matrix with $D_{ii}=\Sigma_j S_{ij}$; L=D−S is the Laplacian matrix; operator $\otimes$ is Kronecker product of matrix; and $I_m$ is an identity matrix of order m; and the transformation function is calculated in dependence on the determined eigenvectors.

8. A method as claimed in claim 1, comprising:

defining a second transformation function that maps each of the nodes in the second multidimensional space on to a respective node in a third multidimensional space having a lower dimensionality than the second multidimensional space, in such a way that neighborhood relationships between nodes in the second multidimensional space are preserved between the respective nodes in the third multidimensional space;

defining a second series of nodes in the third multidimensional space, each of the second series of nodes corresponding to one of the second set of nodes and its location in the third multidimensional space being defined in accordance with the transformation function; and wherein the clustering analysis is performed on the nodes of the third multidimensional space.

9. A method as claimed in claim 1, wherein the method comprises, for at least some of the identified clusters, identifying an image of the video data associated with that cluster and outputting that image.

10. A method as claimed in claim 1, wherein the method comprises: analyzing the video data to identify shots therein; and for at least some of the identified clusters, identifying a shot of the video data associated with that cluster and outputting the video of that shot.

11. A method as claimed in claim 9, comprising means whereby a user can select and view one of the output images or shots.

12. A video processing system for processing video data defining a series of images, the system comprising at least one digital data processor and associated memory configured for:

defining a first series of nodes in a first multidimensional space, each of the first series of nodes corresponding to an image of the series of images and its location in the first space being defined in dependence on appearance components of the respective image;

defining a transformation function that maps each of the nodes in the first multidimensional space on to a respective node in a second multidimensional space having a lower dimensionality than the first multidimensional space, in such a way that neighborhood relationships between nodes in the first multidimensional space are preserved between the respective nodes in the second multidimensional space;

defining a second series of nodes in the second multidimensional space, each of the second series of nodes corresponding to one of the first set of nodes and its location in the second multidimensional space being defined in accordance with the transformation function; and performing a clustering analysis in dependence on the nodes of the second multidimensional space to identify clusters of nodes therein;

wherein defining the transformation function comprises:

defining a graph representing the relationships between neighboring nodes of the first space;

assigning a weight to each such relationship; and calculating the transformation function in dependence on the determined mapping.

13. A system as claimed in claim 12, wherein the location of each point in the first space is defined by means of a pixel and/or feature mapping algorithm performed on a respective one of the images.

14. A system as claimed in claim 12 wherein one of the dimensions in the first multidimensional space represents the time or sequence in the original video of the image corresponding to each of the first series of points.

15. A system as claimed in claim 12, wherein the step of defining a graph comprises:

identifying pairs of the first series of nodes that collectively satisfy a pre-defined neighborhood condition as being neighboring nodes; and defining edges in the first space that connect the neighboring nodes.

16. A system as claimed in claim 15, wherein the neighborhood condition is determined by pre-processing of training data by the system.

17. A system as claimed in claim 15, wherein the step of assigning a weight to each relationship comprises assigning a weight to each edge in dependence on the similarity between the nodes connected by the edge.

18. A system as claimed in claim 17, wherein the step of calculating the transformation function comprises determining the eigenvectors of:

$$A^T(L \otimes I_m)Aw = \lambda A^T(D \otimes I_m)Aw$$

where the dimensionality of the first space is m×n, the number of nodes of the first series is N, A is an (mN×n) matrix generated by arranging all the nodes of the first series in a column, $[A = [A_1^T, A_2^T, \ldots, A_N^T]^T$ is a diagonal matrix with $D_{ii} = \Sigma_j S_{ij}$; L=D−S is the Laplacian matrix; operator $\otimes$ is Kronecker product of matrix; and $I_m$ is an identity matrix of order m; and the transformation function is calculated in dependence on the determined eigenvectors.

19. A system as claimed in claim 12, wherein the processing means is configured for:

defining a second transformation function that maps each of the nodes in the second multidimensional space on to a respective node in a third multidimensional space having a lower dimensionality than the second multidimensional space, in such a way that neighborhood relationships between nodes in the second multidimensional space are preserved between the respective nodes in the third multidimensional space;

defining a second series of nodes in the third multidimensional space, each of the second series of nodes corresponding to one of the second set of nodes and its location in the third multidimensional space being defined in accordance with the transformation function; and wherein the clustering analysis is performed on the nodes of the third multidimensional space.

20. A system as claimed in claim 12, wherein the system is configured to, for at least some of the identified clusters, identify an image of the video data associated with that cluster and output that image.

21. A system as claimed in claim 12, wherein the system is configured to: analyze the video data to identify shots therein; and for at least some of the identified clusters, identify a shot of the video data associated with that cluster and outputting the video of that shot.

22. A system as claimed in claim 20, comprising means whereby a user can select and view one of the output images or shots.

* * * * *